(No Model.)

E. H. JOHNSON.
SAFETY CATCH.

No. 314,582. Patented Mar. 31, 1885.

ATTEST:
E. E. Rowland
W. W. Seely

INVENTOR:
Edward H. Johnson,
By Rich'd N. Dyer,
Atty.

ced March 31, 1885.

UNITED STATES PATENT OFFICE.

EDWARD H. JOHNSON, OF NEW YORK, N. Y., ASSIGNOR TO THE EDISON ELECTRIC LIGHT COMPANY, OF SAME PLACE.

SAFETY-CATCH.

SPECIFICATION forming part of Letters Patent No. 314,582, dated March 31, 1885.

Application filed November 23, 1882. (No model.)

*To all whom it may concern:*

Be it known that I, EDWARD H. JOHNSON, of New York city, in the county and State of New York, have invented a certain new and useful Improvement in Safety-Catches, of which the following is a specification.

Heretofore in systems of distributing electricity for light and power wherein the conductors are connected in multiple arc throughout the system it has been customary to place in one pole or side of the main circuit and in the same pole or side of each branch or sub-branch a safety-catch, composed, preferably, of a conductor fusible at a low heat, which safety-catch is designed to protect the conductors of its circuit by melting and breaking the circuit before the conductors can be heated to an injurious or dangerous extent by an abnormal flow of current; but I have found that the safety-catches in one pole do not afford the desired protection, since it sometimes happens that a leak occurs between the poles, the current passing around one or more intermediate safety-catches, and part of the conductors of the circuit in which such shunted safety-catches are located being forced to carry the current of the leak in addition to that which passes through the safety-catches, and being heated to an injurious and dangerous extent, while the safety-catches remain intact.

The safety-catch of a main circuit often has greater carrying capacity than the conductors of a branch circuit, and when a leak occurs between one conductor of a branch circuit and the other conductor of the main circuit around the safety-catch of the branch circuit a portion of the conductors of the branch circuit which carries the current of the leak may be brought to a high heat, burn off its insulation, and set fire to the surrounding woodwork before the safety-catch in the main circuit is melted. Such leak may occur between a main conductor and a conductor of one of the ultimate branches, or between conductors of circuits more nearly located electrically.

The object, therefore, of my invention is to obviate this difficulty, and this I accomplish by providing each pole of a circuit with a safety-catch.

The two safety-catches protecting the poles of a main circuit, branch circuit, or sub-branch circuit may be arranged upon one or two blocks of insulating material on which the connections are made.

Figure 1:
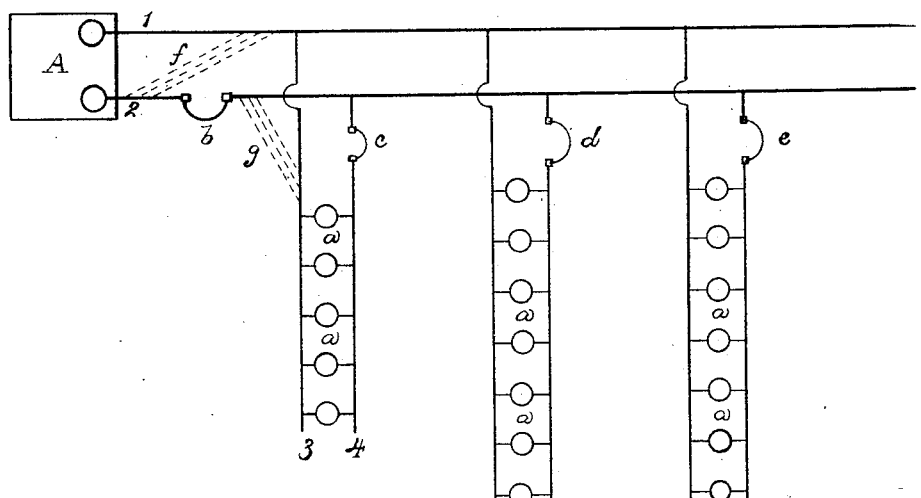
Figure 2:
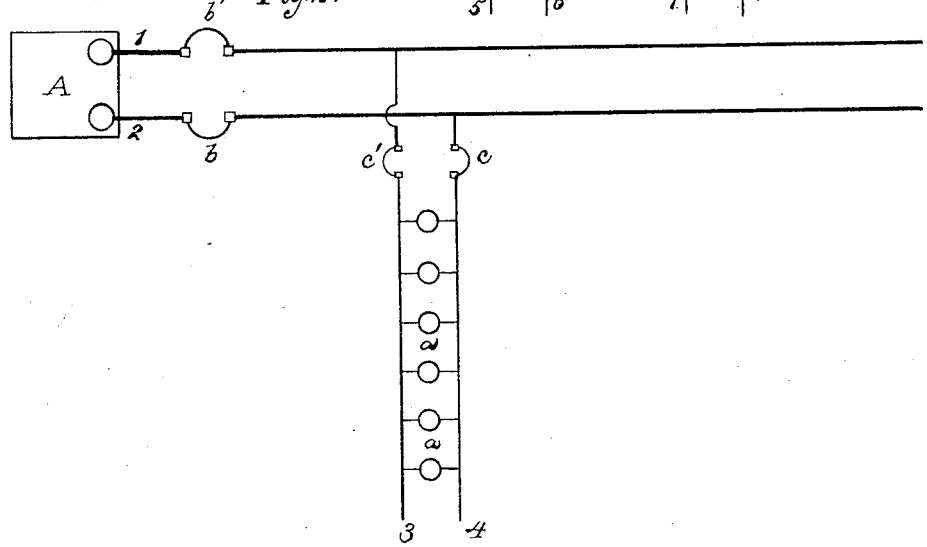

In the accompanying drawings, forming a part hereof, Figure 1 is a diagrammatic view of a system of electric lighting with safety-catches located in one pole only, as heretofore, the dotted lines representing leaks; and Fig. 2, a similar diagram with safety-catches in each pole according to my invention.

A represents the source of electrical energy, consisting, preferably, of one or more dynamo or magneto electric machines. 1 2 are the main conductors leading therefrom, and 3 4 and 5 6 and 7 8 represent branch or derived circuits from 1 2, having electric lamps, motors, or other translating devices, $a$, located in multiple-arc circuits therefrom.

Heretofore the main circuit has been provided with a safety-catch, $b$, in one pole, and the branch circuits with safety-catches $c$ $d$ $e$ in the same pole. These safety catches are preferably lead wire or other suitable material, and are designed and proportioned to melt and break circuit upon the flow of an abnormal current, and before the conductors are dangerously heated. Now, if there is a leak between 1 and 2 around the safety-catch $b$, as shown by the dotted lines at $f$, Fig. 1, the conductors 1 2, between the points of leak and the source of energy A, will have to carry the current of the leak in addition to that which passes through the safety-catch $b$, and if the leak is sufficient the conductors 1 2 may be dangerously heated without affecting the safety-catch $b$. In the same way leaks may occur between opposite poles more distantly located, around one or more intermediate safety-catches. A leak is indicated at $g$, Fig. 1, between 2 and 3, the leak being a shunt around the safety-catch $c$. The circuit 3 4 is designed, for example, for five lights, the conductors being small, while the safety-catch $b$ of the main circuit is designed to carry, say, sixty lights without melting. Now, it is evident that before $b$ will melt on account of the flow caused by the leak the small conductor 3, between the leak and its junction with 1, will be heated to a dangerous extent.

By my invention two safety-catches, $b\ b'$, Fig. 2, are placed in the main circuit, one in each pole, close to the source of energy, and two safety-catches, $c\ c'$, are placed in each branch circuit and sub-branch circuit, one in each pole, at the beginning of the branch or sub-branch.

By the employment of a safety-catch in each pole of the circuit the danger before explained is avoided.

What I claim is—

In a multiple-arc system of electrical distribution, the combination, with the conductors of a circuit, of a safety-catch located in each pole or side of the circuit, substantially as set forth.

This specification signed and witnessed this 7th day of October, 1882.

EDWARD H. JOHNSON.

Witnesses:
H. W. SEELY,
EDWARD H. PYATT.